(12) United States Patent
Sugo

(10) Patent No.: US 8,481,770 B2
(45) Date of Patent: Jul. 9, 2013

(54) SEPARATION METHOD

(75) Inventor: Ken Sugo, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/497,157

(22) PCT Filed: Sep. 17, 2010

(86) PCT No.: PCT/JP2010/066238
§ 371 (c)(1),
(2), (4) Date: Mar. 20, 2012

(87) PCT Pub. No.: WO2011/037094
PCT Pub. Date: Mar. 31, 2011

(65) Prior Publication Data
US 2012/0178950 A1    Jul. 12, 2012

(30) Foreign Application Priority Data

Sep. 25, 2009  (JP) .................................. 2009-221301

(51) Int. Cl.
*C07F 9/02* (2006.01)
(52) U.S. Cl.
USPC .............................................. 554/83; 554/78

(58) Field of Classification Search
USPC ...................................................... 554/78, 83
See application file for complete search history.

(56) References Cited

PUBLICATIONS

Hirotaka Ihara, "Function Design of Silica Coated with Polymer and Development of High Selectivity", 14th Adsorption Symposium in Kumamoto, Aug. 23, 2003.
Search report from International Application No. PCT/JP2010/066238, mail date is Oct. 19, 2012.

*Primary Examiner* — Deborah D Carr
(74) *Attorney, Agent, or Firm* — Greenblum & Bernstein, P.L.C.

(57) ABSTRACT

A method of selectively separating a phospholipid from a sample solution containing the phospholipid is provided. The method comprises: adsorbing calcium ions to a filler, at least a surface of the filler being constituted of a calcium phosphate-based compound; supplying the sample solution into an apparatus having a filling space, wherein the filling space being filled with the filler so that the phospholipid contained in the sample solution is adsorbed to the filler through the calcium ions; supplying an organic solvent-based eluate into the filling space of the apparatus to obtain a liquid containing the phospholipid and discharged from the apparatus; and fractionating the obtained liquid per a predetermined amount to thereby separate the phospholipid from the sample solution.

11 Claims, 12 Drawing Sheets

(a)

Sample: Lecithin liposome 100 μl
Initial Buffer: 5% 2-Propanol-5mM MES-3mM CaCl₂ pH6.8
Final Buffer: 80% 2-Propanol-5mM MES-3mM CaCl₂ pH6.8
Gradient: 3min(0~100%)
Flow rate: 1.0ml/min
Column: 4.0×10mm
CHT: 40 μm, Type II (b)

Sample: 5% Ethanol 100 μl
Initial Buffer: 5% 2-Propanol-5mM MES-3mM CaCl₂ pH6.8
Final Buffer: 80% 2-Propanol-5mM MES-3mM CaCl₂ pH6.8
Gradient: 3min(0~100%)
Flow rate: 1.0ml/min
Column: 4.0×10mm
CHT: 40 μm, Type II

SEPARATION METHOD

TECHNICAL FIELD

The present invention relates to a method of separating a phospholipid selectively from a sample solution.

RELATED ART

A phospholipid is a lipid that has parts of phosphate ester in a chemical structure thereof. The phospholipid forms a lipid double layer because it has amphipathic property. Therefore, the phospholipid becomes not only a main constituent component of a cell membrane with a glycolipid and cholesterol, but also a component acting on signalizations in a living body.

For these reasons, a phospholipid is used as an active ingredient included in supplements and cosmetics, and a drug delivery system (DDS). It is expected that applications to use the phospholipid will be further expanded.

A number of such phospholipids are contained in an egg yolk, a soybean and the like. In recent years, a method of efficiently separating and purifying the phospholipids contained in such natural materials is required. As such a method, attention is paid to a column chromatography method. For example, it is attempted to isolate and purify the phospholipid by using a silica-gel chromatography method (see Non-Patent Document 1).

However, when a silica-gel chromatography method is used for this purpose, there is a fear that functional groups existing on a surface of a silica-gel carrier (filler) and silanol groups remaining on the surface give adverse affects to adsorbing the phospholipid to the carrier and eluting the phospholipid from the carrier. In addition, it is complicated to prepare a generally used eluate in this method because such eluate is a mixture of chroloform, methanol, hexane and the like. Further, since the phospholipid has high adsorbability to the silica-gel carrier, it is difficult to wash the silica-gel carrier included in a column so as to remove the phospholipid adsorbed to the silica-gel carrier. As a result, there is a problem in that it is difficult to repeatedly use the silica-gel carrier.

Therefore, it is also attempted to use a hydroxyapatite chromatography method as an alternative method of the silica-gel chromatography method. However, use of the hydroxyapatite chromatography method still involves the problems in that a method of adsorbing a phospholipid to a filler (carrier) constituted of hydroxyapatite, a method of eluting the adsorbed phospholipid into an eluate, a method of detecting the phospholipid eluted into the eluate and the like have not yet been developed in practical levels.

The Non-Patent Document is Hirotaka Ihara, "Function Design of Silica Coated with Polymer and Development of High Selectivity", 14$^{th}$ Adsorption Symposium in Kumamoto.

SUMMARY OF THE INVENTION

It is an object of the present invention to provide a separation method which is capable of separating a phospholipid selectively from a sample solution containing the phospholipid with simple operations.

This object is achieved by the present inventions (1) to (11) described below.

(1) A method of selectively separating a phospholipid from a sample solution containing the phospholipid, the method comprising: adsorbing calcium ions to a filler, at least a surface of the filler being constituted of a calcium phosphate-based compound; supplying the sample solution into an apparatus having a filling space, wherein the filling space being filled with the filler; supplying an organic solvent-based eluate into the filling space of the apparatus to obtain a liquid containing the phospholipid and discharged from the apparatus; and fractionating the obtained liquid per a predetermined amount to thereby separate the phospholipid from the sample solution.

According to the method described above, it is possible to separate the phospholipid selectively from the sample solution containing the phospholipid with simple operations.

(2) In the method described in the above-mentioned item (1), the calcium ions are contained in a calcium-containing liquid, and the adsorbing the calcium ions is performed by making the calcium-containing liquid contact with the filler.

According to the method described above, it is possible to reliably adsorb the calcium ions to the filler with simple operations that the calcium-containing liquid is supplied into the apparatus.

(3) In the method described in the above-mentioned item (2), the calcium-containing liquid includes a calcium chloride aqueous solution.

According to the method described above, it is possible to reliably adsorb the calcium ions to the calcium phosphate-based compound without adverse affects.

(4) In the method described in the above-mentioned items (1) to (3), the phospholipid includes a phospholipid liposome which forms a liposome.

According to the method described above, when the sample solution is supplied into the apparatus, it is possible to reliably adsorb phospholipids existing as a phospholipid liposome to the filler because the phospholipids take a chemical structure that a phosphate group included in the phospholipid is exposed out of the liposome.

(5) In the method described in the above-mentioned items (1) to (4), in the supplying the organic solvent-based eluate the eluate includes isopropanol.

According to the method described above, it is possible to reliably elute the phospholipid into each fraction in a state that the phospholipid is separated from contaminating substances (foreign substances) other than the phospholipid with reliably eluting (removing) the phospholipid adsorbing to the filler from the filler.

(6) In the method described in the above-mentioned item (5), in the supplying the organic solvent-based eluate the eluate is a linear gradient solution in which an amount of the isopropanol is changed from 0 to 80%.

According to the method described above, it is possible to more reliably elute the phospholipid into each fraction in a state that the phospholipid is separated from contaminating substances (foreign substances) other than the phospholipid.

(7) In the method described in the above-mentioned items (1) to (4), in the supplying the organic solvent-based eluate a flow rate of the eluate is in the range of 0.1 to 10 mL/min.

By separating the phospholipid with such a flow rate, it is possible to reliably separate a target phospholipid, namely obtain the phospholipid with high purity, without long time to be needed to separation operations.

(8) In the method described in the above-mentioned items (1) to (7), in the fractionating the obtained liquid the phospholipid is detected by observing absorbances of the fractionated liquids in a wavelength of the range of 190 to 230 nm.

Since the wavelength within such a range is a wavelength of which light is absorbed by a phosphate group included in the phospholipid, it is possible to reliably detect the phospholipid in the liquid by observing absorbances thereof in the wavelength of the range.

(9) In the method described in the above-mentioned item (8), the method further comprises preliminarily obtaining an absorbance of the eluate, wherein in the fractionating the obtained liquid the phospholipid is detected by subtracting the preliminarily obtained absorbance of the eluate from the absorbance of each of the fractionated liquids to be observed.

According to the method described above, it is possible to compensate the absorbance derived from the eluate. In other words, it becomes possible to detect the phospholipid in the liquid with high sensitivity because noises derived from the eluate can be removed.

(10) In the method described in the above-mentioned items (1) to (9), the calcium phosphate-based compound is constituted of hydroxyapatite as a main component thereof.

Since hydroxyapatite, particularly, is a substance similar to constituent components of the living body, it is possible to reliably prevent such a phospholipid from being altered (deactivated) when adsorbing and separating the phospholipid.

(11) In the method described in the above-mentioned items (1) to (10), the method further comprises preparing the apparatus preliminarily.

According to the present invention, it is possible to adsorb the phospholipid contained in the sample solution to the filler, and selectively elute the adsorbed phospholipid into the eluate. Therefore, it is possible to separate the phospholipid from the sample solution containing the phospholipid with high purity.

Further, by appropriately setting the conditions to observe the liquid containing the phospholipid, it is possible to detect the phospholipid contained in the liquid with high purity.

DETAILED DESCRIPTION OF THE PREFERRED EMBODIMENTS

Hereinbelow, a separation method according to the present invention will be described in detail based on a preferred embodiment shown in the accompanying drawings.

First, prior to the description of the separation method according to the present invention, one example of an adsorption apparatus (separation apparatus) to be used in the present invention will be described.

Figure 1:
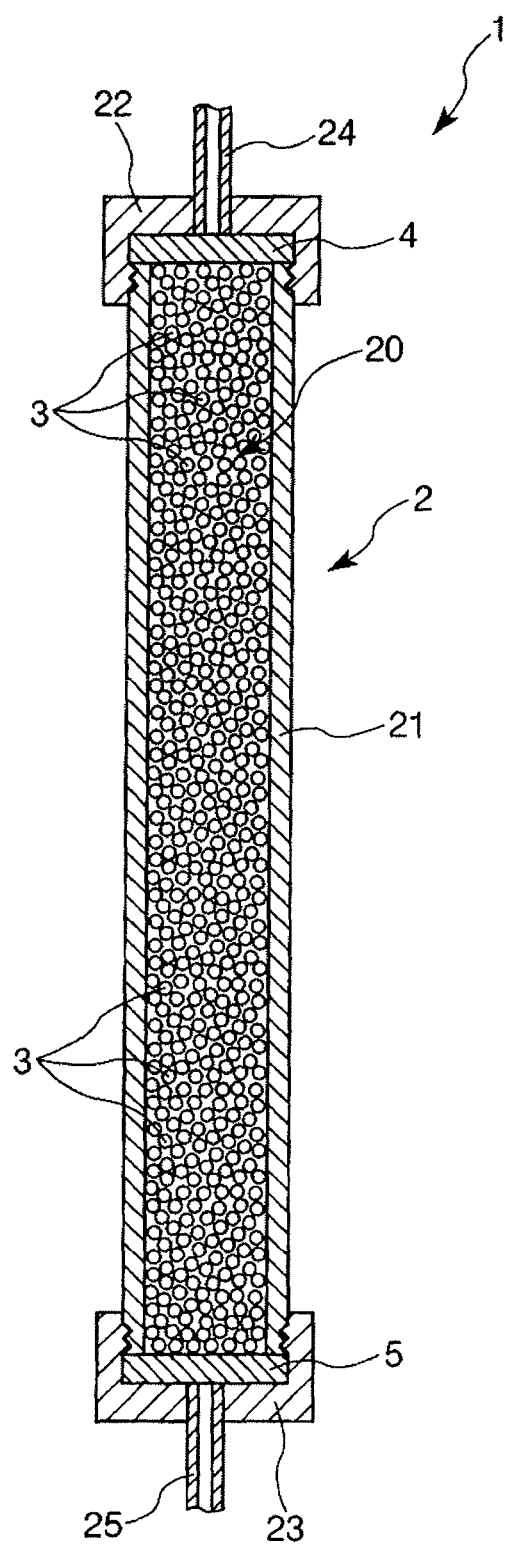
FIG. 1 is a sectional view which shows one example of an adsorption apparatus to be used in the present invention.

FIG. 1 is a sectional view which shows one example of an adsorption apparatus to be used in the present invention. It is to be noted that in the following description, the upper side and the lower side in FIG. 1 will be referred to as "inflow side" and "outflow side", respectively.

More specifically, the inflow side means a side from which liquids such as a sample solution (i.e., a liquid containing a sample) and an organic solvent-based eluate are supplied into the adsorption apparatus to separate (purify) a target phospholipid, and the outflow side means a side located on the opposite side from the inflow side, that is, a side through which the liquids described above discharge out of the adsorption apparatus as a discharge liquid.

In this regard, hereinbelow, a description will be made on a case that the phospholipid is selectively separated from a sample derived from an egg yolk by using the adsorption apparatus 1.

The adsorption apparatus 1 shown in FIG. 1, which is used for separating (isolating) the phospholipid from the sample solution, includes a column 2, a granular filler (adsorbent) 3, and two filter members 4 and 5.

The column 2 is constituted from a column main body 21 and caps 22 and 23 to be attached to the inflow-side end and outflow-side end of the column main body 21, respectively.

The column main body 21 is formed from, for example, a cylindrical member. Examples of a constituent material of each of the parts (members) constituting the column 2 including the column main body 21 include various kinds of glass materials, various kinds of resin materials, various kinds of metal materials, various kinds of ceramic materials and the like.

An opening of the column main body 21 provided on its inflow side is covered with the filter member 4, and in this state, the cap 22 is threadedly mounted on the inflow-side end of the column main body 21. Likewise, an opening of the column main body 21 provided on its outflow side is covered with the filter member 5, and in this state, the cap 23 is threadedly mounted on the outflow-side end of the column main body 21.

The column 2 having such a structure has an adsorbent filling space 20 which is defined by the column main body 21 and the filter members 4 and 5, and at least a part of the adsorbent filling space 20 is filled with the filler 3 (in this embodiment, almost the entire of the adsorbent filling space 20 is filled with the filler 3).

A volumetric capacity of the adsorbent filling space 20 is appropriately set depending on the volume of a sample solution to be used. Such a volumetric capacity is not particularly limited, but is preferably in the range of about 0.1 to 100 mL, and more preferably in the range of about 1 to 50 mL per 1 mL of the sample solution.

By setting a size of the adsorbent filling space 20 to a value within the above range and by setting a size of the filler 3 (which will be described later) to a value within a range as will be described later, it is possible to selectively isolate (purify) the target phospholipid from the sample solution. That is to say, it is possible to reliably separate the phospholipid from contaminating substances (foreign substances) other than the phospholipid contained in the sample solution.

Further, liquid-tightness between the column main body 21 and the caps 22 and 23 is ensured by attaching the caps 22 and 23 to the openings of the column main body 21.

An inlet pipe 24 is liquid-tightly fixed to the cap 22 at substantially the center thereof, and an outlet pipe 25 is also liquid-tightly fixed to the cap 23 at substantially the center thereof. The sample solution (liquid) described above is supplied to the adsorbent filling space 20 through the inlet pipe 24 and the filter member 4. The sample solution supplied to the adsorbent filling space 20 pass through gaps between particles of the filler 3 and then discharge out of the column 2 through the filter member 5 and the outlet pipe 25. At this time, the phospholipid and the contaminating substances other than the phospholipid contained in the sample solution (sample) are separated from each other based on a difference between adsorptions of the phospholipid and the contaminating substances with respect to the filler 3 adsorbing the calcium ions and a difference between affinities of the phospholipid and the contaminating substances with respect to an organic solvent-based eluate.

Each of the filter members 4 and 5 has a function of preventing the filler 3 from discharging out of the adsorbent filling space 20. Further, each of the filter members 4 and 5 is formed of a nonwoven fabric, a foam (a sponge-like porous body having communicating pores), a woven fabric, a mesh or the like, which is made of a synthetic resin such as polyurethane, polyvinyl alcohol, polypropylene, polyetherpolyamide, polyethylene terephthalate, or polybutylene terephthalate.

At least a surface of the filler 3 is constituted of a calcium phosphate-based compound. As described later, the calcium ions are adsorbed to such a filler 3. The phospholipid is specifically adsorbed to such a filler 3 adsorbing the calcium ions with adsorbability (supported power) which is inherently possessed by them. Therefore, the phospholipid are separated from the contaminating substances other than the phospholipid and purified based on a difference between the adsorbability of the phospholipid and the adsorbability of the contaminating substances other than the phospholipid.

Examples of the calcium phosphate-based compound include, but are not limited thereto, hydroxyapatite ($Ca_{10}(PO_4)_6(OH)_2$), TCP ($Ca_3(PO_4)_2$), $Ca_2P_2O_7$, $Ca(PO_3)_2$, DCPD ($CaHPO_4 \cdot 2H_2O$), $Ca_4O(PO_4)_2$, materials in which a part of these materials is substituted by other atoms or other atom groups, and the like. These calcium phosphate-based compounds can be used singly or in combination of two or more of them.

Among these calcium phosphate-based compounds mentioned above, one containing the hydroxyapatite as a main component of the filler 3 is preferred. In particular, the hydroxyapatite is a substance similar to components of a living body. Therefore, when the phospholipid is adsorbed to and separated (desorbed) from the filler 3, it is possible to reliably prevent such a phospholipid from being altered (denatured).

Further, as shown in FIG. 1, the filler 3 described above preferably has a particulate (granular) shape, but may have another shape such as a pellet (small block)-like shape or a block-like shape (e.g., a porous body in which adjacent pores communicate with each other or a honeycomb shape). By forming the filler 3 having the particulate shape, it is possible to increase its surface area, and thereby improving separation characteristics of the phospholipid.

An average particle size of the filler 3 having the particulate shape is not particularly limited, but is preferably in the range of about 0.5 to 150 μm, and more preferably in the range of about 10 to 80 μm. By using the filler 3 having such an average particle size, it is possible to reliably prevent clogging of the filter member while a sufficient surface area of the filler 3 is ensured.

It is to be noted that the filler 3 may be entirely constituted of the calcium phosphate-based compound. Alternatively, the filler 3 may be formed by coating the surface of a carrier (base) with the calcium phosphate-based compound. It is preferred that the filler 3 may be entirely constituted of the calcium phosphate-based compound. This makes it possible to further improve strength of the filler 3, thereby obtaining a suitable column to be used in separating a large amount of the phospholipid.

The filler 3 entirely constituted of the calcium phosphate-based compound can be obtained as follows. Phosphate calcium-based compound particles (primary particles) is obtained by using a wet synthesis method or a dry synthesis method, a slurry containing such phosphate calcium-based compound particles is prepared, and then the slurry is dried or granulated to obtain dried particles. Thereafter, the dried particles are sintered to obtain the filler 3 entirely constituted of the calcium phosphate-based compound.

On the other hand, the filler 3 formed by coating the surface of the carrier with the calcium phosphate-based compound can be obtained by using a method that the dried particles are collided (hybridized) with the carrier constituted of resins or the like.

In the case where almost the entire of the adsorbent filling space 20 is filled with the filler 3 as this embodiment, the filler 3 preferably has substantially the same composition at every point in the adsorbent filling space 20. This makes it possible to allow the adsorption apparatus 1 to have a particularly excellent ability to separate (purify) the phospholipid.

In this regard, it is to be noted that the adsorbent filling space 20 may be partially filled with the filler 3 (e.g., a part of the adsorbent filling space 20 located on its one side where the inlet pipe 24 is provided may be filled with the filler 3). In this case, the remaining part of the adsorbent filling space 20 may be filled with another filler.

Next, a method of separating the phospholipid by using the adsorption apparatus 1 described above (i.e., a separation method according to the present invention) will be described.

(1) Sample Solution Preparation Step

First, an egg yolk is prepared as a sample, for example, a total lipid contained in this egg yolk is extracted to prepare a sample solution.

A method of extracting the total lipid from the egg yolk is not particularly limited, but is preferably various kinds of extracting methods using an organic solvent. Examples of such various kinds of extracting methods include a Bligh-Dyer method using chloroform and methanol, a Folch method and the like.

Here, a simple lipid and a complex lipid are included in the total lipid. Further, a phospholipid and a glycolipid are included in the complex lipid.

The egg yolk prepared in this embodiment includes phosphatidyl choline (lecithin), lysophosphatidylcholine, phosphatidyl ethanolamine, lysophosphatidylethanolamine, sphingomyelins, phosphatidyl inositol, plasmalogen, and the like as the phospholipid. These phospholipids are isolated (separated) from the sample solution containing the total lipid by the separation method of the phospholipid using the adsorption apparatus 1.

The sample solution to be supplied to the adsorption apparatus 1 is not particularly limited as long as the sample solution contains the phospholipids extracted from the egg yolk. However, it is preferred that the sample solution contains a phospholipid liposome in which the phospholipids form a liposome. Therefore, when the sample solution is supplied into the adsorption apparatus 1 in the step (3) which will be described, the phospholipid liposome takes a structure (state) that phosphate groups provided with the phospholipids are exposed out of the liposome. In other words, hydrophobic parts of fatty acid esters provided with the phospholipids are aggregated to each other and then spherical aggregations are formed, so that is formed the structure that hydrophilic phosphate groups provided with the phospholipids are exposed. Therefore, it is possible to reliably adsorb the phospholipids existing as the phospholipid liposome to the filler 3.

The sample solution containing such a phospholipid liposome, for example, can be obtained by adding water to the extracted liquid containing the total lipid extracted from the egg yolk and vigorously stirring that.

An average particle size of the phospholipid liposome contained in the sample solution is not particularly limited, but is preferably in the range of about 10 to 1000 nm, and more preferably in the range of about 50 to 200 nm. The phospholipid liposome having the average particle size within the range makes it possible to reliably adsorb to the filler 3 when the sample solution is supplied into the adsorption apparatus 1.

(2) Calcium Ions Adsorption Step

Next, calcium ions are adsorbed to the filler 3.

Here, the phospholipid has glycerin and sphingosine as a central skeleton and a chemical structure that fatty acids and phosphoric acid are bonded to the central skeleton. In addition to that, the phospholipid also has a chemical structure that an alcohol and the phosphoric acid are bonded to each other with an ester bond. In the phospholipid having such chemical structures, two of three hydroxyl groups (namely, PO-groups) of the phosphoric acid are bonded to the central skeleton and the alcohol, respectively. Remaining one is ionized, thereby forming a phosphate site which is charged negatively.

Further, the calcium phosphate-based compound of the filler 3 is represented by a chemical formula: $Ca_{10}(PO_4)_3X_2$. A Ca/P ratio of the calcium phosphate-based compound to be used is in the range of 1.0 to 2.0. The calcium phosphate-based compound has a structure that positively charged calcium ions (calcium sites) and negatively charged phosphate groups (phosphate sites) are regularly arranged with a high density state. Furthermore, the calcium phosphate-based compound has adsorption capability due to electrostatic interaction as an amphoteric ion exchange body. Therefore, the calcium phosphate-based compound exhibits the adsorption capability due to the electrostatic interaction in the calcium sites with respect to the phospholipid having the phosphate site. Oh the other hand, repulsive force is generated in the phosphate site because both the phosphate sites of the phospholipid and the phosphate sites of the calcium phosphate-based compound are negatively charged.

As described above, when the negatively charged phospholipid is adsorbed to the calcium phosphate-based compound, it is impossible to sufficiently adsorb the phospholipid to the filler 3 due to the fact that the calcium phosphate-based compound exhibits the adsorption capability due to the electrostatic interaction as the amphoteric ion exchange body which is charged both positively and negatively.

In contrast, the calcium ions are bonded to the phosphate sites in the calcium phosphate-based compound in the present invention because the calcium ions are adsorbed to the filler 3. For this reason, the calcium sites are expanded and the phosphate cites are reduced in the filler 3. As a result, the adsorption capability of the negatively charged phospholipid with respect to the filler 3 is improved.

In this regard, although it is preferred that the calcium ions are bonded to substantially all of the phosphate sites of the calcium phosphate-based compound, the calcium ions may be bonded to at least the phosphate cites which are located in an outer surface of the filler 3. A bonding ratio of the calcium ions and the phosphate sites in the outer surface of the filler 3 is preferably in the range of about 5 to 100%, more preferably in the range of about 10 to 100%, and even more preferably in the range of about 20 to 100%. The bonding ratio of the calcium ions and the phosphate sites may be obtained (calculated) from an amount (adsorbed amount) of a protein adsorbed to the phosphate sites when the protein to be adsorbed to the phosphate sites is supplied into the adsorbent filling space 20 of the adsorption apparatus 1 in which the calcium phosphate-based compound is filled. In the case where the 100% of the calcium ions is bonded to the phosphate sites, the protein to be adsorbed to the phosphate sites passes through the adsorbent filling space 20.

A method of adsorbing the calcium ions to the filler 3 is not particularly limited, but examples of the method include a method of making a calcium-containing liquid contact with the filler 3 and the like. According to such a method, it is possible to reliably adsorb the calcium ions to the filler 3 with a simple operation that involves an operation of making the calcium-containing liquid contact with the filler 3, namely supplying the calcium-containing liquid into the adsorption apparatus 1.

The calcium-containing liquid is not particularly limited, but examples of the calcium-containing liquid include a calcium chloride aqueous solution, a calcium lactate aqueous solution, a calcium nitrate aqueous solution and the like. Among them, the calcium chloride aqueous solution is preferable. By using such an aqueous solution, it is possible to reliably adsorb the calcium ions to the phosphate sites of the calcium phosphate-based compound without adverse affects to the calcium phosphate-based compound.

An amount of calcium chloride in the calcium chloride aqueous solution is not particularly limited, but is preferably in the range of about 0.5 to 10 mM and more preferably in the range of about 1 to 3 mM.

Further, a pH of the calcium chloride aqueous solution is not particularly limited, but is preferably in the range of about 5.0 to 9.0 and more preferably in the range of about 6.0 to 8.0.

By setting the conditions of the calcium chloride aqueous solution as described above, it is possible to reliably adsorb the calcium ions contained in the calcium chloride aqueous solution to the filler 3.

(3) Supplying Step

Next, the sample solution, which has been prepared in the above step (1), is supplied to the adsorbent filling space 20 through the inlet pipe 24 and the filter member 4. Then, the sample solution passes through the column 2 (adsorption apparatus 1), thereby making contact with the filler 3 in which the calcium ions are adsorbed in the above step (2).

As described in the above step (2), since the calcium ions are adsorbed to the filler 3 in the present invention, the phospholipid having high adsorbability to the filler 3 adsorbing the calcium ions and the contaminating substances (e.g. simple lipid or glycolipid) other than the phospholipid, which has relatively high adsorbability to the filler 3 adsorbing the calcium ions, are carried on the filler 3 in the adsorbent filling space 20. The contaminating substances having low adsorbability to the filler 3 are discharged out of the column 2 through the filter member 5 and the outlet pipe 25.

(4) Fractionation Step

Next, an organic solvent-based eluate to elute the phospholipid is supplied into the column 2 through the inlet pipe 24. Thereafter, a liquid discharged out of the column 2 through the outlet pipe 25 (discharge liquid) is fractionated (collected) to different portions at every predetermined amount.

As described above, the organic solvent-based eluate is used as an eluate to elute the phospholipid in this present invention. By using such an organic solvent-based eluate, it has found by developments of the inventors that it is possible to reliably elute the phospholipid, which is adsorbed to the filler 3 adsorbing the calcium ions with the high adsorbability, to the eluate.

Therefore, by appropriately setting a kind of organic solvent-based eluate and an amount of the organic solvent in the eluate, it is possible to collect (separate) the phospholipid derived from the egg folk and adsorbed to the filler 3 and the contaminating substances other than the phospholipids into each fraction (portion) based on a difference between the adsorbabilities of these compounds (phospholipids and contaminating substances) with respect to the filler 3.

As the organic solvent-based eluate, it is preferred that an aqueous solution containing a water-soluble organic solvent is used. Further, the water-soluble organic solvent is not particularly limited, but examples thereof include isopropanol, butanol, acetonitrile, pyridine, N,N-dimethylformamide and the like. These materials may be used singly or in combination of two or more of them. Among them, it is preferred that isopropanol is used. This makes it possible to reliably elute the phospholipids into each fraction in a state that the phospholipids are separated from the contaminating substances other than the phospholipids while reliably eluting the phospholipids adsorbed to the filler 3 from the filler 3.

On the other hand, in the case where isopropanol is used as the water-soluble organic solvent, it is preferable to use a linear gradient solution as the eluate, wherein an amount of isopropanol contained in the eluate is progressively increased. In this case, it is more preferable to use the linear gradient solution, wherein the amount of isopropanol is increased from 0 to 80%. This makes it possible to reliably elute the phospholipids into each fraction in a state that the phospholipids are separated from the contaminating substances other than the phospholipids.

A pH of the eluate is not particularly limited, but is preferably in the range of about 6 to 8, and more preferably in the range of about 6.5 to 7.5. This makes it possible to prevent the phospholipids to be separated from being altered, thereby preventing the property thereof from being changed. In addition, it is also possible to reliably prevent the filler 3 from being altered (dissolved), thereby preventing separation property of the filler 3 from being changed in the adsorption apparatus 1.

A temperature of the eluate is not also particularly limited, but is preferably in the range of about 30 to 50° C., and more preferably in the range of about to 45° C. This makes it possible to prevent the phospholipids to be separated from being altered.

Therefore, by using the eluate of which pH and temperature fall within the above noted ranges, it is possible to improve a collection rate of a target phospholipid.

Further, a flow rate of the eluate to flow in the adsorbent filling space 20 is preferably in the range of about 0.1 to 10 mL/min, and more preferably in the range of about 1 to 5 mL/min. By separating the phospholipids from the sample solution at such a flow rate, it is possible to reliably separate the target phospholipid from the sample solution without long time to be needed to the separation operation. That is to say, it is possible to obtain the phospholipid having high purity.

Further, a test which fractions (portions) the phospholipids are eluted, namely a detection of the phospholipids in each fraction is not limited in a method thereof. However, it is preferred that the detection is carried out by observing absorbances of the discharge liquid in each fraction. This makes it possible to test, which fractions the phospholipids are eluted, with relatively easy operations that the absorbances of the discharge liquid in each fraction is observed with time.

In the case where the detection of the phospholipids in each fraction is carried out by observing the absorbances of the discharge liquid in each fraction, a wavelength to detect the phospholipids is preferably in the range of about 190 to 230 nm and more preferably in the range of about 200 to 210 nm. The wavelengths within such a range make it possible to reliably detect the phospholipids in the discharge liquid by observing the absorbances of the discharge liquid in the wavelengths within the range. This is because the phosphate groups included in the phospholipids absorb light in the wavelengths within such a range.

Further, in this case, it is preferred that absorbances of an eluate (blank) are preliminarily measured, and then the measured absorbances of the eluate (blank) are subtracted from the absorbances of the discharge liquid in each fraction to be observed to thereby obtain absorbances of the discharge liquid in each fraction. This makes it possible to compensate the absorbances derived from the eluate. In other words, it is possible to remove noises of the absorbances derived from the eluate, so that it becomes possible to detect the phospholipids in discharge liquid with more high sensitivity.

According to the present invention, it is possible to separate (collect) the phospholipids derived from the egg folk into a predetermined fraction with high purity by using the relatively easy operations. Such relatively easy operations are operations that the calcium ions are adsorbed to the filler which is constituted of the calcium phosphate-based compound, the sample solution containing the phospholipids and the filler make contact with each other in a column, and thereafter the organic solvent-based eluate is supplied into the column.

In the above description, the description is made on one example in the case where the phospholipids derived from the egg folk are extracted from the total lipid. However, the present invention is not limited to such a case. According to the present invention, for example, it is capable of separating even phospholipids contained in a pulse such as a soybean, various kinds of cells such as erythrocyte and Gram-negative bacterium, virus and the like with ease and high purity.

Although the separation method according to the present invention has been described above, the present invention is not limited thereto. For example, the separation method according to the present invention may further include one or more steps for any purpose.

EXAMPLES

Next, the present invention will be described with reference to specific examples.

1. Preparation of Phospholipid Liposomes
(Lecithin Liposome-Containing Liquid)

—1A—First, lecithin derived from an egg folk (Lot No. 126-00812 produced by Wako Pure Chemical Industries, Ltd.) was prepared and stirred. Then, the lecithin of 60 μL was added to ethanol of 1.94 mL to obtain a lecithin-ethanol additive. Next, the lecithin-ethanol additive was stirred by using a rotator ("RT-50" produced by TAITEC CORPORATION) under the conditions of 30 rpm×15 min (room temperature).

—2A—Next, the stirred lecithin-ethanol additive was subjected to a centrifugal separation device under the conditions of 8000 rpm×5 min (room temperature) to obtain a supernatant.

—3A—Next, 1.5 mL of the supernatant (ethanol-soluble fraction) obtained in the above step 2A was vigorously added to water of 30 mL with stirring the water in three parts by using a 500 μL microsyringe for chromate-inkjet ("MS-R500" produced by Ito Kabushiki Kaisha) to obtain a mixture. Thereafter was stirred for about 3 minutes to prepare a lecithin liposome-containing liquid.

In the thus obtained lecithin liposome-containing liquid, sizes of lecithin liposomes contained in the lecithin liposome-containing liquid were measured three times in total by using a apparatus for determining a particle size distribution in dynamic scattering ("N5" produced by Beckman Coulter, Inc.).

Figure 2:
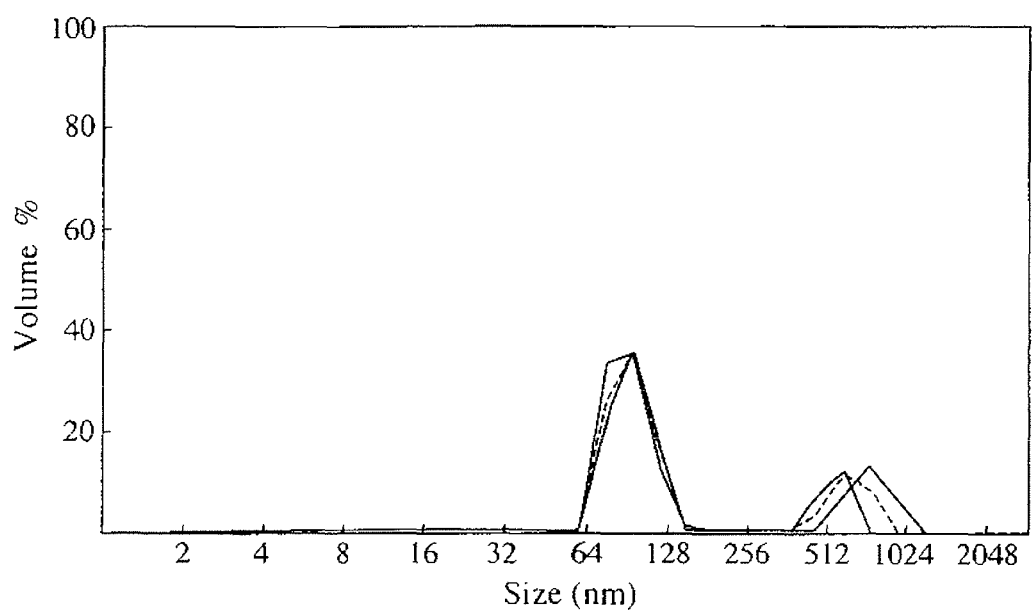
FIG. 2 shows particle size distribution curves of lecithin liposomes contained in a lecithin liposome-containing solution.

The results are shown in FIG. 2 and Table 1.

—3B—Next, the column was filled (equilibrated) with the NaPB of 1 mM (initial buffer). Thereafter, 100 μL of the phospholipid liposomes prepared in the above item 1 was supplied (applied) into the column as a sample solution.

—4B—Next, the NaPB of 1 mM was supplied into the column for 1 minute at a flow rate of 1 mL/min. Next, a mixture of the NaPB of 1 mM and the NaPB of 400 mM was supplied into the column for 3 minutes at the flow rate of 1 mL/min so that an amount ratio between the NaPB of 1 mM and the NaPB of 400 mM was continuously changed in the range of 0 to 100% of the amount of the NaPB of 400 mM. Thereafter, the NaPB of 400 mM was supplied into the column for 3 minutes at the flow rate of 1 mL/min to fractionate the liquid discharged (discharge liquid) from the column to different portions at every 1 mL. The fractionated liquids were subjected to an UV detector to obtain absorbances of the phospholipids contained in the fractionated liquids.

Figure 3:
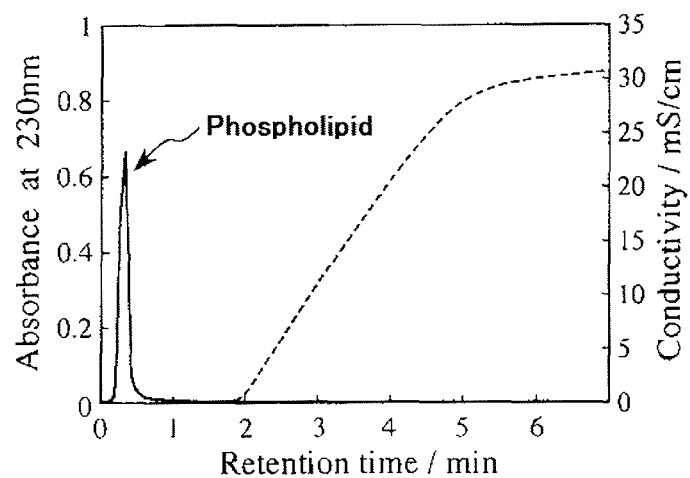
FIG. 3 shows an absorbance curve measured by using a liquid discharged from an adsorption apparatus when a sample solution containing a phospholipid is supplied into the adsorption apparatus.

The results are shown in FIG. 3.

As clearly seen from FIG. 3, in the case where the hydroxyapatite beads, which did not adsorb the calcium ions, were used, it found that the phosphate liposomes were eluted into the discharge liquids without adsorbing to the filler.

In this regard, the phosphate liposomes were analyzed as the same manner in the above steps 1B to 4B except that pure water was used as an initial buffer and the column was equilibrated with the pure water in the above step 3B. In this case, were also obtained the results that the phosphate liposomes were eluted into the discharge liquids without adsorbing to the filler.

(Analysis Using Calcium Chloride Aqueous Solution)

TABLE 1

| | Analysis Conditions | | | | Analysis Results | | | | | |
|---|---|---|---|---|---|---|---|---|---|---|
| | Minimum Particle size [nm] | Maximum Particle size [nm] | Viscosity [cP] | RI | Particle Size [nm] | % | Standard deviation [nm] | Average particle size [nm] | Average SD [nm] | % Dust |
| Sample 1 | 3.0 | 3000 | 1.002 | 1.333 | 90.4 | 81.2 | 16.5 | 176.8 | 218.6 | 0.0 |
| | | | | | 5540.7 | 18.8 | 67.3 | | | |
| Sample 2 | | | | | 95.3 | 74.9 | 18.6 | 262.3 | 354.6 | 0.0 |
| | | | | | 761.3 | 25.1 | 134.6 | | | |
| Sample 3 | | | | | 92.9 | 78.0 | 17.3 | 212.1 | 275.3 | 0.0 |
| | | | | | 634.0 | 22.0 | 107.4 | | | |

As clearly seen from FIG. 2 and Table 1, the lecithin liposomes could be produced in the water by vigorously adding the ethanol-soluble fraction to the water in a state of stirring that. It is guessed that lecithin liposomes having the particle size of about 100 nm and lecithin liposomes having the particle size of about 500 nm are included in these lecithin liposomes. The lecithin liposomes having the particle size of about 500 nm is constituted by aggregating the lecithin liposomes having the particle size of about 100 nm or by forming a big monolayer liposome.

2. Adsorption of Phospholipid Liposomes to Filler
(Analysis Using Sodium Phosphate Buffer)

—1B—First, hydroxyapatite beads (GHT TypeII, average particle size of 40 μm, produced by HOYA CORPORATION) (filler) was filled into a stainless tube having a size of 4×10 mm to prepare a column (adsorption apparatus).

—2B—Next, a sodium phosphate buffer of 1 mM (hereinafter, referred to as "NaPB"; pH 6.8) and a NaPB of 400 mM (PH 6.8) were prepared as a buffer for adsorbing the phospholipids.

The phosphate liposomes were adsorbed to the filler as the same manner in the analysis using the sodium phosphate buffer except that the above steps 3B and 4B were changed as follows.

—3B'—Next, the column was equilibrated with a mixture of a MES buffer of 5 mM and a $CaCl_2$ aqueous solution of 3 mM (pH 6.8). Thereafter, 100 μL of the phospholipid liposomes prepared in the above item 1 was supplied (applied) into the column as a sample solution.

—4B'—Next, the mixture of the MES buffer of 5 mM and the $CaCl_2$ aqueous solution of 3 mM was supplied into the column for 5 minutes at the flow rate of 1 mL/min. Next, pure water was supplied into the column for 5 minutes at the flow rate of 1 mL/min. Then, a mixture of the pure water and the NaPB of 400 mM was further supplied into the column for 3 minutes at the flow rate of 1 mL/min so that an amount ratio between the pure water and the NaPB of 400 mM was continuously changed in the range of 0 to 100% of the amount of the NaPB of 400 mM. Thereafter, the NaPB of 400 mM was supplied into the column for 5 minutes at the flow rate of 1 mL/min to fractionate the liquid discharged from the column to different portions at every 1 mL. The fractionated liquids were subjected to an UV detector to obtain absorbances of the phospholipids contained in the fractionated liquids.

Figure 4:
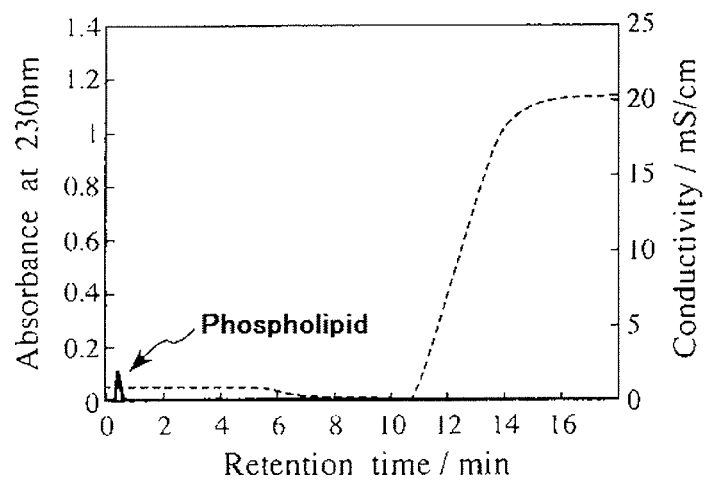
FIG. 4 shows an absorbance curve measured by using a liquid discharged from an adsorption apparatus when a sample solution containing a phospholipid is supplied into the adsorption apparatus.

The results are shown in FIG. 4.

As clearly seen from FIG. 4, the elution of the phospholipid liposomes seen just after the mixture of the MES buffer of 5 mM and the $CaCl_2$ aqueous solution of 3 mM was supplied into the column was slightly confirmed. From this fact, the followings were guessed. The calcium ions were adsorbed to the filler by making the mixture of the MES buffer of 5 mM and the $CaCl_2$ aqueous solution of 3 mM contact with the filler. Consequently, the phospholipid liposomes were adsorbed to the hydroxyapatite beads which have adsorbed the calcium ions.

3. Elution of Phospholipid Liposomes Adsorbed to Filler (Evaluation of Separation Capability of Column Adsorbing Phospholipid Liposomes to Proteins)

[Production of Column Adsorbing Phospholipid Liposomes]

—1C—First, hydroapatite beads (GHT TypeII, average particle size of 40 μm, produced by HOYA CORPORATION) were filled into a stainless tube having a size of 4×10 mm to prepare a column (adsorption apparatus).

—2C—Next, the NaPB of 400 mM (pH 6.8) was supplied into the column for 10 minutes at the flow rate of 1 mL/min. Therefore, a filler was washed by supplying pure water to the column under the same conditions as described above.

—3C—Next, the mixture of the MES buffer of 5 mM and the $CaCl_2$ aqueous solution of 3 mM (hereinafter, referred to as "MES-Ca buffer", pH 6.8) was supplied into the column for 20 minutes at the flow rate of 1 mL/min to adsorb the calcium ions to the filler.

—4C—Next, 100 μL of the phospholipid liposomes prepared in the item 1 was supplied (applied) into the column every 2 minutes in a total of 15 times while supplying the MES-Ca buffer into the column at the flow rate of 1 mL/min. Therefore, the filler in the column was washed by pure water for 5 minutes.

—5C—Next, the filler in the column was equilibrated with the NaPB of 10 mM (pH 6.8) by washing it with the NaPB of 400 mM (pH 6.8) for 10 minutes at the flow rate of 1 mL/min, and then, further washing it with the NaPB of 10 mM (pH 6.8) for 20 minutes at the flow rate of 1 mL/min.

By completing the steps as described above, was obtained a column providing with the filler on which phospholipid liposomes were adsorbed.

(Separation of Proteins by Column Adsorbing Phospholipid Liposomes)

—1D—First, hydroapatite beads (GHT TypeII, average particle size of 40 μm, produced by HOYA CORPORATION) were filled into a stainless tube having a size of 4×10 mm to prepare a column (adsorption apparatus).

—2D—Next, the filler in the column was equilibrated with the NaPB of 10 mM (pH 6.8) by washing it with the NaPB of 400 mM (pH 6.8) for 10 minutes at the flow rate of 1 mL/min, and then, further washing it with the NaPB of 10 mM (pH 6.8) for 20 minutes at the flow rate of 1 mL/min.

—3D—Next, myoglobin, ovalbumin, α-chymotrypsinogen A and cytochrome C (proteins) were dissolved in a sodium phosphate buffer of 1 mM so that their concentrations became 0.5 mg/mL, 1 mg/mL, 0.5 mg/mL and 0.5 mg/mL, respectively, to obtain a sample (hereinafter, referred to as "4STD sample"). Then, 50 μL of the 4STD sample was supplied into the column obtained in the above step 2D.

—4D—Next, the NaPB of 10 mM was supplied into the column for 1 minute at the flow rate of 1 mL/min. Next, a mixture of the NaPB of 10 mM and the NaPB of 400 mM was supplied into the column for 3 minutes at the flow rate of 1 mL/min so that an amount ratio between the NaPB of 10 mM and the NaPB of 400 mM was continuously changed in the range of 0 to 75% of the amount of the NaPB of 400 mM. Thereafter, the NaPB of 400 mM was supplied into the column for 5 minutes at the flow rate of 1 mL/min to fractionate the liquid discharged from the column to different portions at every 1 mL. The fractionated liquids were subjected to an UV detector to obtain absorbances of the proteins contained in the fractionated liquids.

—5D—Next, 50 μL of the 4STD sample was supplied into the column, which was obtained in the above step 5C and provided with the filler adsorbing the phospholipid liposomes, as the same manner in the above step 3D.

—6D—Next, the liquid discharged from the column was fractionated to the different portions at every mL as the same manner in the above step 4D. The fractionated liquids were subjected to an UV detector to obtain absorbances of the proteins contained in the fractionated liquids.

Figure 5:
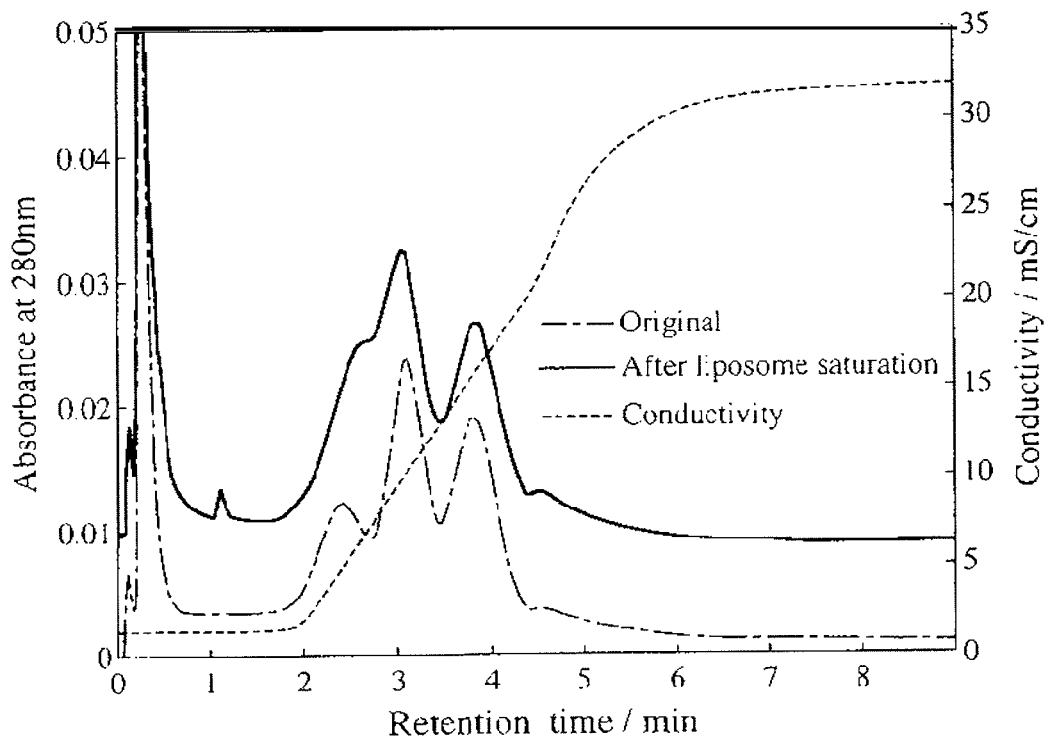
FIG. 5 shows absorbance curves in a state that proteins contained in a 4STD sample are separated from each other by using an adsorption apparatus which provides with a filler adsorbing a phospholipid liposome.

The absorbances in a wavelength of 280 nm of the proteins contained in the liquids fractionated in the above steps 4D and 6D are shown in FIG. 5.

As clearly seen from FIG. 5, it found that the separation capability of the 4STD was changed by adsorbing the phospholipid liposomes to the filler (After liposome sturation) as compared with an filler (Original) before the phospholipid liposomes were adsorbed.

(Evaluation by Washing Column Adsorbing Phospholipid Liposomes with Solvent)

Were prepared three columns which were obtained in the above step 5C and provided with the filler adsorbing the phospholipid liposomes. The filler in each of the three columns was washed by using various kinds of solvents (acetonitrile, isopropanol and 1M sodium hydroxide) of 100 CV (column capacity).

—2E—Next, the filler in each of the three columns in which the filler was washed by the various kinds of solvents was equilibrated with the NaPB of 10 mM (pH 6.8) by supplying the NaPB of 400 mM (pH 6.8) for 10 minutes at the flow rate of 1 mL/min into the column, and then, further supplying the NaPB of 10 mM (pH 6.8) for 20 minutes at the flow rate of 1 mL/min into the column.

—3E—Next, 50 μL of the 4STD sample was supplied into each of the three columns in which the filler was washed by the various kinds of solvents.

—4E—Next, the NaPB of 10 mM was supplied into the column, in which the 50 μL of the 4STD sample was supplied, for 1 minute at the flow rate of 1 mL/min. Next, a mixture of the NaPB of 10 mM and the NaPB of 400 mM was supplied into the column for 3 minutes at the flow rate of 1 mL/min so that an amount ratio between the NaPB of 10 mM and the NaPB of 400 mM was continuously changed in the range of 0 to 75% of the amount of the NaPB of 400 mM. Thereafter, the NaPB of 400 mM was supplied into the column for 5 minutes at the flow rate of 1 mL/min to fractionate the liquid discharged from the column to different portions at every 1 mL. The fractionated liquids were subjected to an UV detector to obtain absorbances of the proteins contained in the fractionated liquids.

Figure 6:
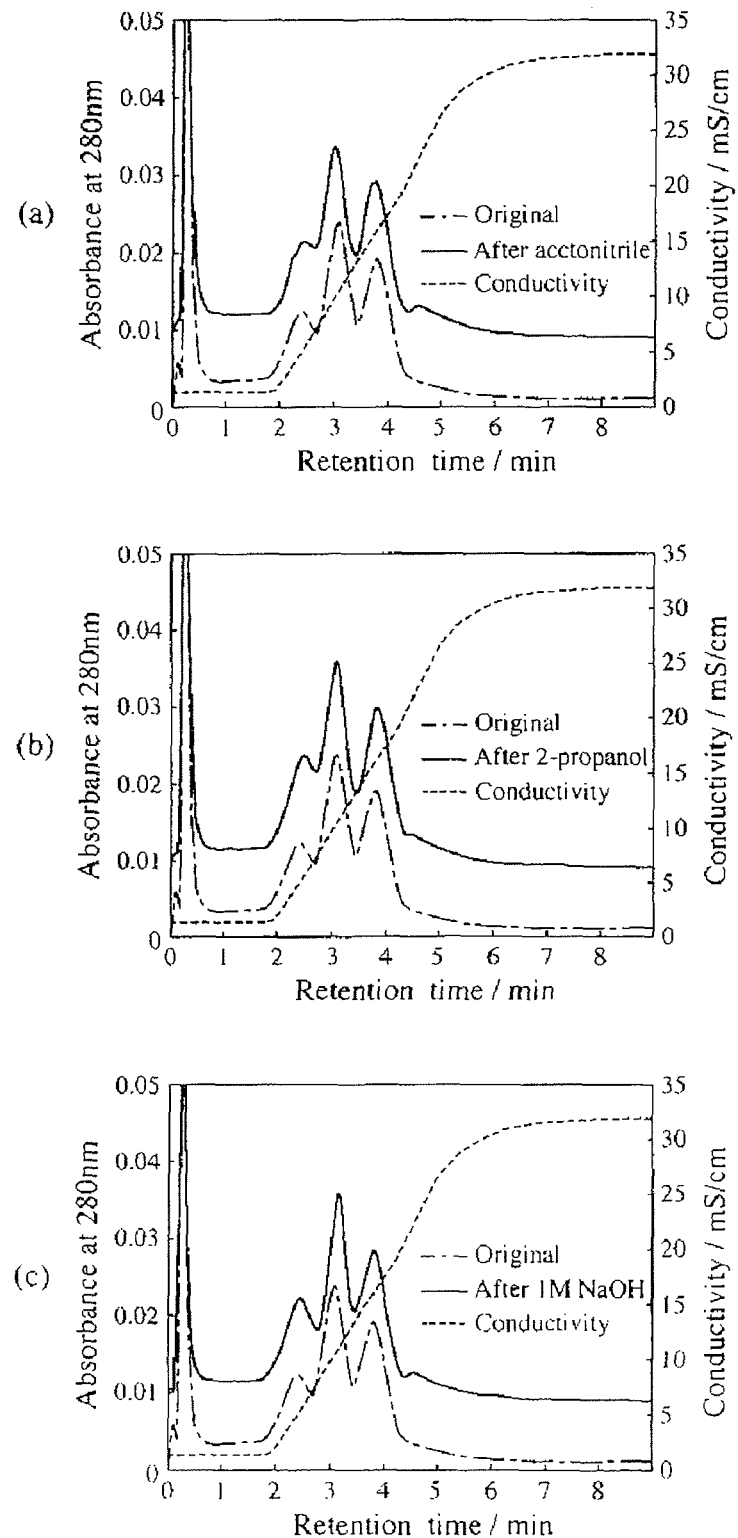
FIG. 6 shows absorbance curves in a state that proteins contained in a 4STD sample are separated from each other by using an adsorption apparatus which provides with a filler which has been washed with various kinds of solvents.

The results are shown in FIG. 6. In this regard, FIG. 6(a) shows absorbances of the proteins measured by using liquids discharged from the column in which the filler was washed with acetonitrile. FIG. 6(b) shows absorbances of the proteins measured by using liquids discharged from the column in which the filler was washed with isopropanol. FIG. 6(c)

shows absorbances of the proteins measured by using liquids discharged from the column in which the filler was washed with sodium hydroxide.

As clearly seen by comparing FIG. 5 with FIGS. 6(a) to (c), it found that the separation capability of the 4STD was closely similar to the separation capability of the 4STD in the filler before the phospholipid liposomes were adsorbed by washing the filler, in which phospholipid liposomes were adsorbed, with the various kinds of solvents. It found that the phospholipid liposomes could be eluted (eliminated) from the filler by washing the filler with the various kinds of solvents. Such a tendency was seen prominently when an organic solvent was used as a solvent (FIG. 6(a) and FIG. 6(b)). In particular, it found that the tendency was seen more prominently when isopropanol was used as the solvent (FIG. 6(b)).

—5E—Next, in each of the column in which the filler was washed with the various kinds of solvents and the column before the filler was washed with the solvent, the filler was removed from the column. Then, the filler was dried at a temperature of 37° C. for 1 day.

—6E—Next, 10 mg of the dried filler was prepared. Then, a value of thermogravimetric change was measured by using a thermogravimetric-differential thermogravimetric analyzer ("DTG60H" produced by Shimadzu Corporation). In this regard, the measurement conditions were set to a temperature rate of 5° C./min, a target temperature 1200° C. and a temperature range of 26.17 to 400° C.

Figure 7:
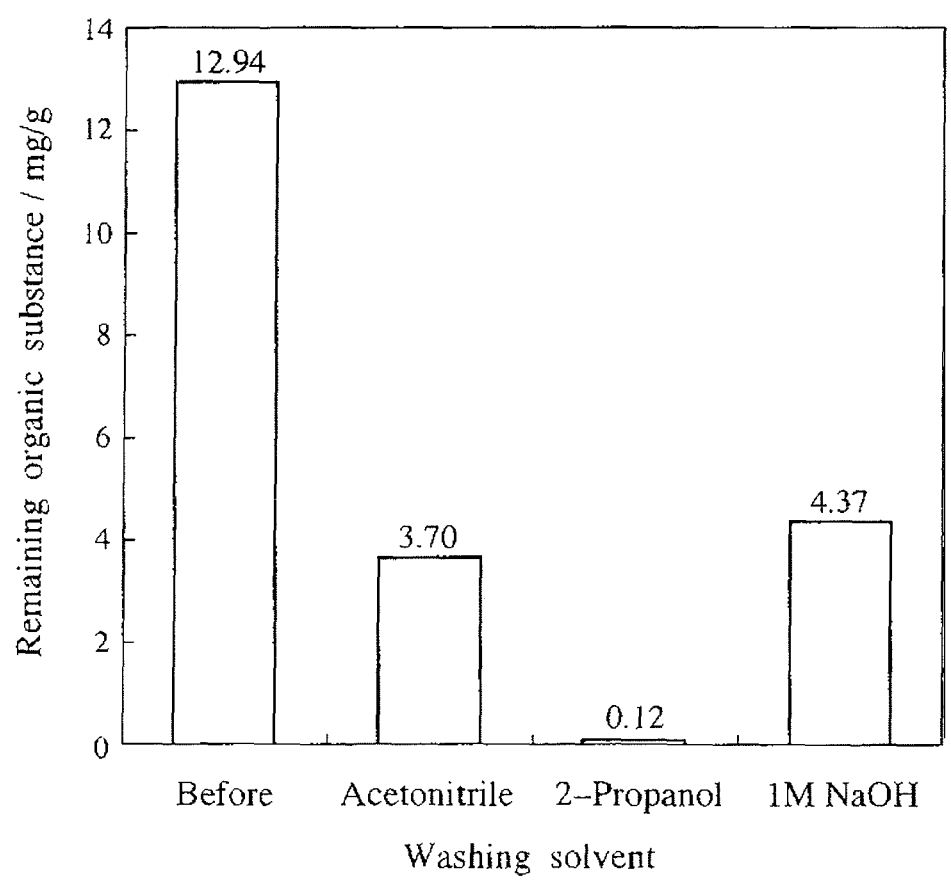
FIG. 7 shows amounts of organic materials remaining to a filler which has been washed with various kinds of solvents.

The results are shown in FIG. 7. An amount of a remaining organic substance of the vertical axis of the graph shown in FIG. 7 was calculated by using the value of the thermogravimetric change and a value obtained by subtracting an amount of the remaining organic substance in the hydroapatite beads CHT TypeII from an amount of the remaining organic substance in the dried filler.

As clearly seen from FIG. 7, it found that the amount of the remaining organic substance adsorbing to each of the fillers was lowered by washing the filler, in which phospholipid liposomes were adsorbed, with the various kinds of solvents. It found that the phospholipid liposomes could be eluted from the filler by washing the filler with the various kinds of solvents. Such a tendency was seen prominently when an organic solvent was used as a solvent (FIG. 6(a) and FIG. 6(b)). In particular, it found that the tendency was seen more prominently when isopropanol was used as the solvent (FIG. 6(b)).

4. Separation of Phospholipid Liposomes by Filler

Detection of Lecithin

Example 1

—1F—First, hydroxyapatite beads (GHT TypeII, average particle size of 40 μm, produced by HOYA CORPORATION) were filled into a stainless tube having a size of 4×10 mm to prepare a column (adsorption apparatus).

—2F—Next, a MES-Ca buffer was supplied into the column for 20 minutes at the flow rate of 1 mL/min to adsorb the calcium ions to the filler.

—3F—Next, the column was filled (equilibrated) with the MES-Ca buffer. Thereafter, 100 μL of the phospholipid liposomes prepared in the above item 1 was supplied (applied) into the column as a sample solution.

—4F—Next, a MES-Ca buffer containing 5% isopropanol was supplied into the column for 1 minute at the flow rate of 1 mL/min. Next, a mixture of the MES-Ca buffer containing 5% isopropanol and a MES-Ca buffer containing 80% isopropanol was supplied into the column for 3 minutes at the flow rate of 1 mL/min so that an amount ratio between the MES-Ca buffer containing 5% isopropanol and the MES-Ca buffer containing 80% isopropanol was continuously changed in the range of 0 to 100% of the amount of the MES-Ca buffer containing 80% isopropanol. Thereafter, the MES-Ca buffer containing 80% isopropanol was supplied into the column for 3 minutes at the flow rate of 1 mL/min to fractionate the liquid discharged from the column to different portions at every 1 mL. The phospholipids contained in the liquid discharged from the column were detected by measuring absorbances thereof in a wavelength of 202 nm.

Figure 8:
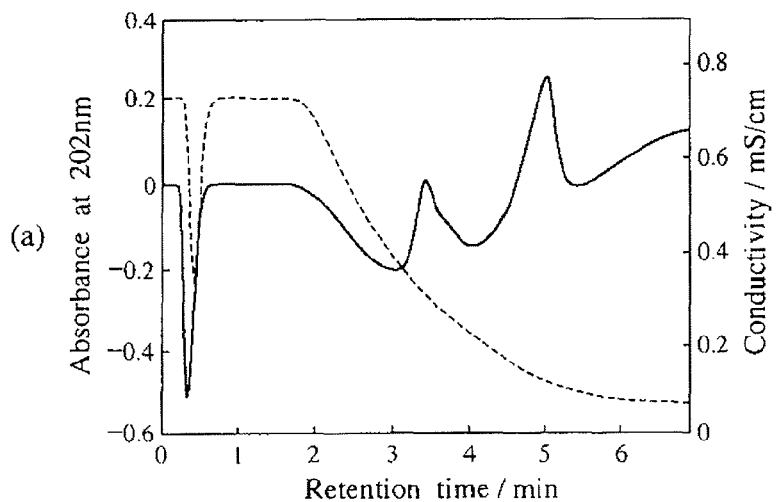
FIG. 8 shows absorbance curves in a state that lecitin contained in a sample solution is separated by using an adsorption apparatus.
Figure 8:
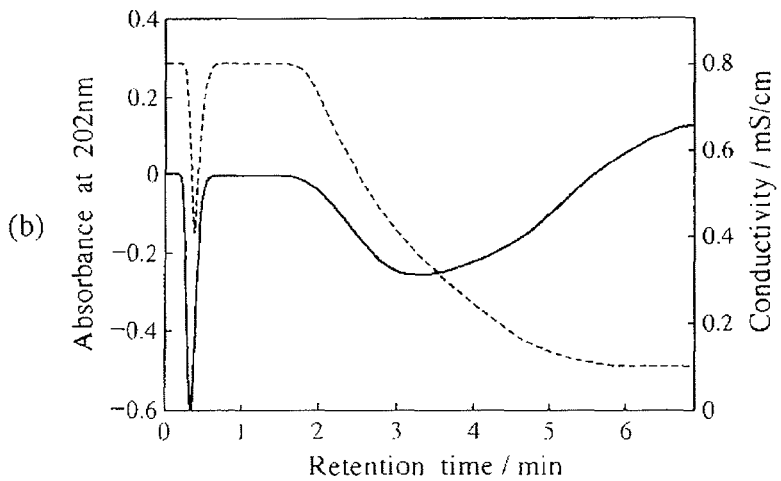

The results are shown in FIG. 8(a) as an absorbance curve.

—5F—Next, 5% ethanol aqueous solution was supplied into the column as a blank sample. Thereafter, the same eluate as that in the above step 4F was supplied into the column to discharge the eluate from the column. Thus, absorbances derived from the eluate were measured in the wavelength of 202 nm.

The results are shown in FIG. 8(b) as an absorbance curve.

—6F—Next, the absorbances of the absorbance curve obtained in the above step 5F were subtracted from the absorbances of the absorbance curve obtained in the above step 4F.

Figure 9:
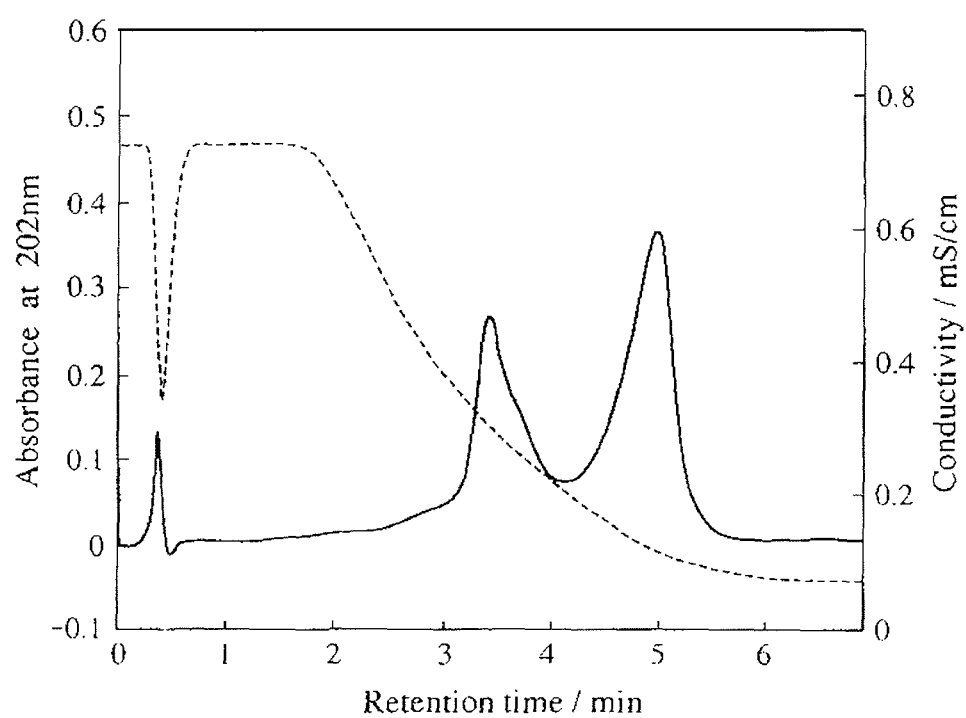
FIG. 9 shows an absorbance curve in a state that lecitin contained in a sample solution is separated by using an adsorption apparatus.

The results are shown in FIG. 9 as an absorbance curve.

As clearly seen from FIG. 9, it found that peaks derived from the lecithin could be observed after about 3.5 min and 5 min in the absorbance curve with high sensitivity by measuring the absorbances of the eluate containing the phospholipids in the wavelength of 202 nm which is close to a wavelength of maximum absorption of the lecithin, further measuring the absorbances of the eluate containing isopropanol, and then subtracting these absorbances.

Separation of Phospholipids from Egg Yolk

Example 2

—1G—First, 18 mL of methanol and 9 mL of chloroform were added to an egg yolk (Asagiri Kogen Eggs) in this order while stirring the egg yolk of 5 g to obtain a first mixture. Thereafter, the first mixture was left stand for 30 minutes.

—2G—Next, 10.8 mL of pure water and 9 mL of chloroform were added to the first mixture in this order while stirring the first mixture to obtain a second mixture. Thereafter, the second mixture was subject to a centrifugal separation device ("5930" produced by KUBOTA CORPORATION) under the conditions of 3000 rpm×10 min (4° C.) to separate the second mixture to an upper phase (water phase), a middle phase (phase of modified proteins and the like) and a lower phase (chloroform phase).

—3G—Next, the lower phase was collected with a syringe to obtain the lower phase of 15 mL in total.

—4G—Next, the lower phase of 15 mL was moved into an eggplant flask, and then dried under the reduced pressure by using an evaporator ("N-1000" produced by TOKYO RIKAKIKAI CO., LTD.). Thereafter, the eggplant flask was placed in a desiccator to further dry the dried lower phase for 1 hour under the reduced pressure. Thus, a total lipid derived from the egg folk of about 1.5 g was extracted.

—5G—Next, pure water of 50 mL was added to the eggplant flask. Thereafter, the pure water was heated at a temperature above a phase transition temperature of the total lipid in hot water while stirring the pure water by using a voltex to obtain a lipid dispersion liquid.

—6G—Here, it is guessed that the lipid contained in the lipid dispersion liquid forms a multilayer liposome. However, the lipid dispersion liquid was subjected to an ultrasonic generator ("UR-20P" produced by TOMY SEIKO CO., LTD.) for 1 minute to crush the multilayer of the multilayer liposome. Thus, a total lipid liposome derived from the egg yolk was obtained.

—7G—Next, the obtained total lipid liposome derived from the egg yolk was diluted in the pure water by times, to thereby prepare a sample solution to be supplied into the column.

—8G—Next, hydroxyapatite beads (GHT TypeII, average particle size of 40 μm, produced by HOYA CORPORATION) were filled into a stainless tube having a size of 4×10 mm to prepare a column (adsorption apparatus).

—9G—Next, the MES-Ca buffer was supplied into the column for 20 minutes at a flow rate of 1 mL/min to adsorb the calcium ions to the filler.

—10G—Next, the column was filled (equilibrated) with the MES-Ca buffer. Thereafter, 100 μL of the sample solution prepared in the above step 7G was supplied (applied) into the column.

—11G—Next, the MES-Ca buffer containing 5% isopropanol was supplied into the column for 1 minute at a flow rate of 1 mL/min. Next, a mixture of the MES-Ca buffer containing 5% isopropanol and the MES-Ca buffer containing 80% isopropanol was supplied into the column for 3 minutes at the flow rate of 1 mL/min so that an amount ratio between the MES-Ca buffer containing 5% isopropanol and the MES-Ca buffer containing 80% isopropanol was continuously changed in the range of 0 to 100% of the amount of the MES-Ca buffer containing 80% isopropanol. Thereafter, 100% isopropanol was supplied into the column for 3 minutes at the flow rate of 1 mL/min to fractionate the liquid discharged from the column to different portions at every 1 mL. The phospholipids contained in the liquid discharged from the column were detected by measuring absorbances thereof in the wavelength of 202 nm.

Figure 10:
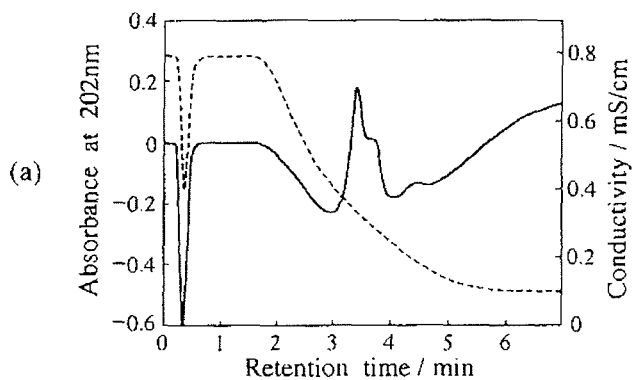
FIG. 10 shows absorbance curves in a state that a phospholipid derived from an egg yolk and contained in a sample solution is separated by using an adsorption apparatus.
Figure 10:
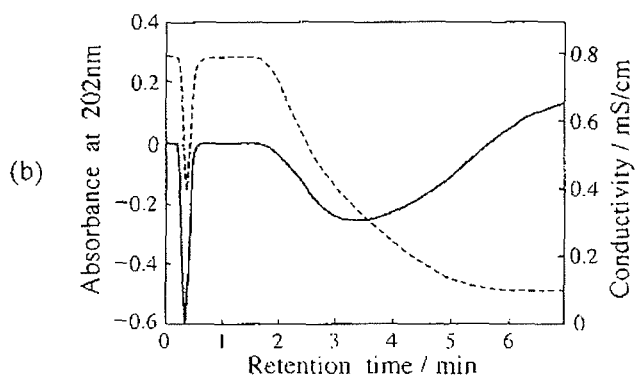
Figure 10:
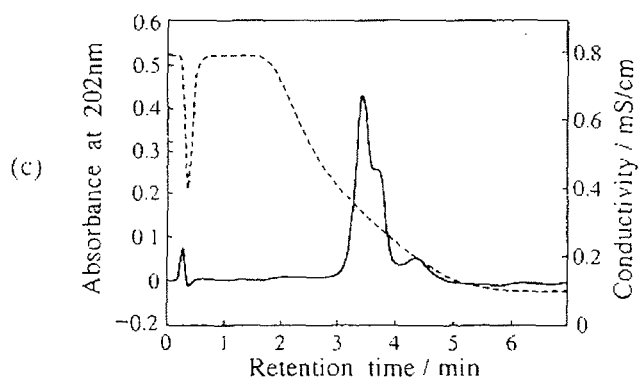

The results are shown in FIG. 10 (*a*) as a absorbance curve.

—12G—Next, pure water was supplied into the column as a blank sample. Thereafter, the same eluate as that in the above step 11G was supplied into the column to discharge the eluate from the column. Thus, absorbances derived from the eluate were measured in the wavelength of 202 nm.

The results are shown in FIG. 10(*b*) as an absorbance curve.

—13G—Next, the absorbances of the absorbance curve obtained in the above step 11G were subtracted from the absorbances of the absorbance curve obtained in the above step 12G.

The results are shown in FIG. 10 (*c*) as an absorbance curve.

As clearly seen from FIG. 10, it found that peaks derived from the phospholipids could be observed after about 3.5 min by measuring the absorbance of the eluate containing the phospholipids in the wavelength of 202 nm which is close to the wavelength of maximum absorption of the phospholipids, further measuring the absorbances of the eluate containing isopropanol, and then subtracting these absorbances. This indicated that the phospholipids derived from the egg folk were separated from the sample solution in the fractions corresponding to the peaks.

Separation of Phospholipids from Red Blood Cell Membrane

Example 3

—1H—First, 100 mL of pure water was added to a goose blood cell (produced by Nippon Biotest Laboratories Inc.) while stirring the goose blood cell of 4 g to obtain a first mixture. Then, a red blood cell contained in the goose blood cell was hemolyzed.

—2H—Next, the first mixture was subject to a centrifugal separation device ("5930" produced by KUBOTA CORPORATION) under the conditions of 3500 rpm×30 min (4° C.) while stirring the first mixture to separate the first mixture to an upper phase and a lower phase.

—3H— The above steps 1H and 2H were repeatedly carried out three times. At that time, the lower phase was collected every time.

—4H—Next, 8 mL of PBS, 20 mL of methanol and 10 mL of chloroform were added to the collected lower phase in this order while stirring the collected lower phase to obtain a second mixture. Thereafter, the second mixture was left stand for 30 minutes.

—5H—Next, 10 mL of chloroform and 10 mL of pure water were added to the second mixture in this order while stirring the second mixture to obtain a third mixture. Thereafter, the third mixture was subject to a centrifugal separation device ("5930" produced by KUBOTA CORPORATION) under the conditions of 3000 rpm×10 min (4° C.) to separate the third mixture to an upper phase (water phase), a middle phase (phase of modified proteins and the like) and a lower phase (chloroform phase).

—6H—Next, the lower phase was collected with a syringe to obtain the lower phase of 15 mL in total.

—7H—Next, the lower phase of 15 mL was moved into an eggplant flask, and then dried under the reduced pressure by using an evaporator ("N-1000" produced by TOKYO RIKAKIKAI CO., LTD.). Thereafter, the eggplant flask was placed in a desiccator to further dry the dried lower phase for 1 hour under the reduced pressure. Thus, a total lipid derived from the red blood cell membrane of about 15 mg was extracted.

—8H—Next, pure water of 10 mL was added to the eggplant flask. Thereafter, the pure water was heated at a temperature above a phase transition temperature of the total lipid in hot water while stirring the pure water by using a voltex to obtain a lipid dispersion liquid.

—9H—Here, it is guessed that the lipid contained in the lipid dispersion liquid forms a multilayer liposome. However, the lipid dispersion liquid was subjected to an ultrasonic generator ("UR-20P" produced by TOMY SEIKO CO., LTD.) for 1 minute to crush the multilayer of the multilayer liposome. Thus, a total lipid liposome derived from the red blood cell membrane was obtained.

—10H—Next, the obtained total lipid liposome derived from the red blood cell membrane was diluted in pure water by 20 times, to thereby prepare a sample solution to be supplied into the column.

—11H—Next, hydroxyapatite beads (GHT TypeII, average particle size of 40 μm, produced by HOYA CORPORATION) was filled into a stainless tube having a size of 4×10 mm to prepare a column (adsorption apparatus).

—12H—Next, the MES-Ca buffer was supplied into the column for 20 minutes at the flow rate of 1 mL/min to adsorb the calcium ions to the filler.

—13H—Next, the column was filled (equilibrated) with the MES-Ca buffer. Thereafter, 100 μL of the sample solution prepared in the above step 10H was supplied (applied) into the column.

—14G—Next, the MES-Ca buffer containing 5% isopropanol was supplied into the column for 1 minute at the flow rate of 1 mL/min. Next, a mixture of the MES-Ca buffer containing 5% isopropanol and the MES-Ca buffer containing 80% isopropanol was supplied into the column for 3 minutes at the flow rate of 1 mL/min so that an amount ratio between the MES-Ca buffer containing 5% isopropanol and the MES-Ca buffer containing 80% isopropanol was continuously changed in the range of 0 to 100% of the amount of the MES-Ca buffer containing 80% isopropanol. Thereafter, the MES-Ca buffer containing 80% isopropanol was supplied into the column for 3 minutes at the flow rate of 1 mL/min to fractionate the liquid discharged from the column to different portions at every 1 mL. The phospholipids contained in the liquid discharged from the column were detected by measuring absorbances thereof in the wavelength of 202 nm.

Figure 11:
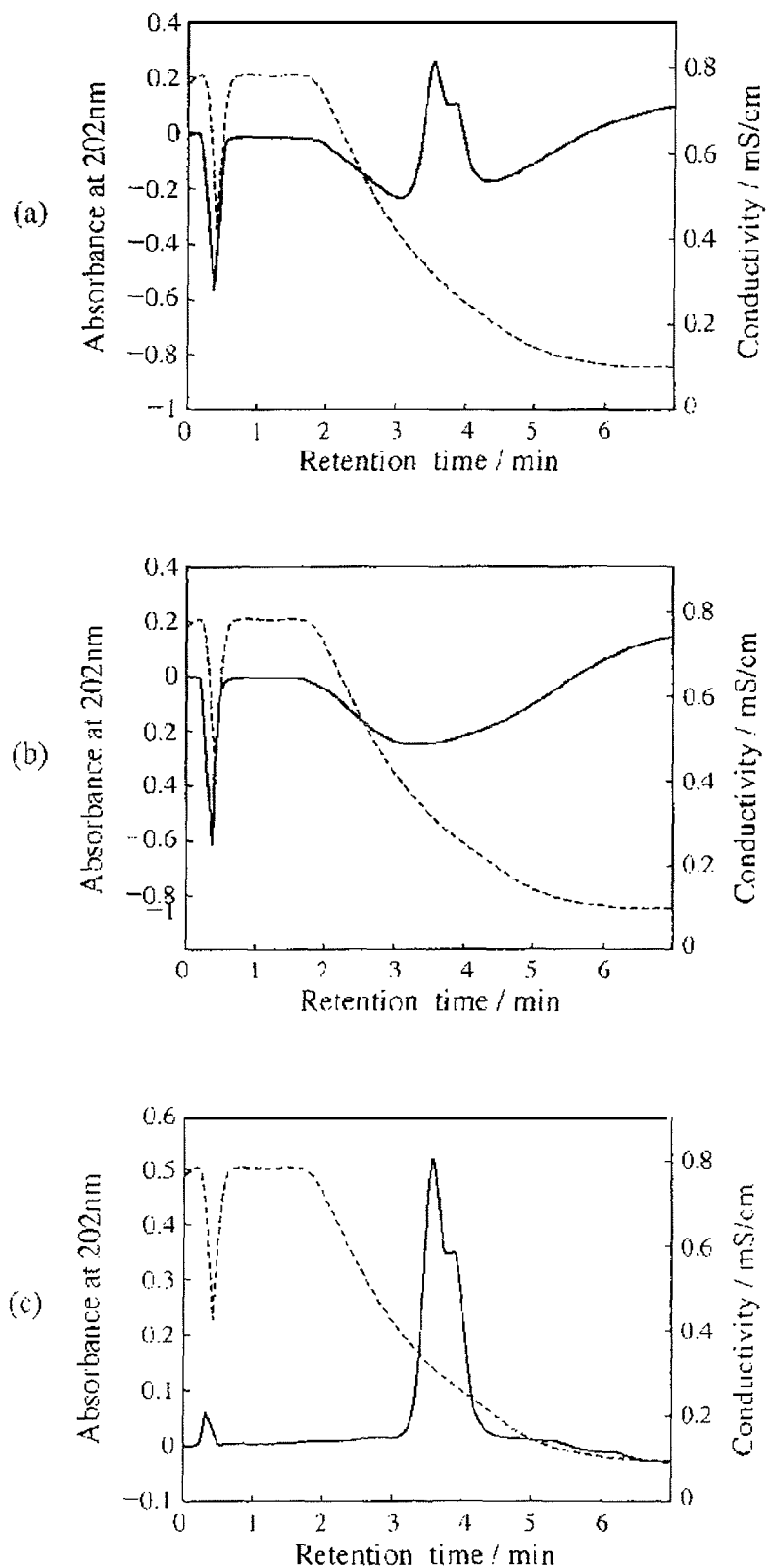
FIG. 11 shows absorbance curves in a state that a phospholipid derived from a red cell membrane and contained in a sample solution is separated by using an adsorption apparatus.

The results are shown in FIG. 11 (a) as an absorbance curve.

—15H—Next, pure water was supplied into the column as a blank sample. Thereafter, the same eluate as that in the above step 13H was supplied into the column to discharge the eluate from the column. Thus, absorbances derived from the eluate were measured in the wavelength of 202 nm.

The results are shown in FIG. 11(b) as an absorbance curve.

—16H—Next, the absorbances of the absorbance curve obtained in the above step 15H were subtracted from the absorbances of the absorbance curve obtained in the above step 14H.

The results are shown in FIG. 11(c) as an absorbance curve.

As clearly seen from FIG. 11, peaks derived from the phospholipids could be observed after about 3.5 min. Therefore, according to the present invention, it found that the phospholipids could be also separated from the red blood cell membrane.

Detection of Endotoxin

Example 4

—1I—First, a Control Standard Endotoxin (hereinafter, simply referred to as "endotoxin" procuced by Wako Pure Chemical Industuries, Ltd.) was prepared. 2.6 mL of pure water were added to the endotoxin of 500 ng to obtain an endotoxin aqueous solution. Then, the endotoxin aqueous solution was stirred under the conditions of 30 rpm×15 min (room temperature) by using a rotator ("RT-50" produced by TAITEC CORPORATION). Thereafter, the endotoxin aqueous solution was subjected to an ultrasonic wave treatment to obtain a sample solution containing the endotoxin.

—2I—Next, hydroxyapatite beads (GHT TypeII, average particle size of 40 μm, produced by HOYA CORPORATION) was filled into a stainless tube having a size of 4×10 mm to prepare a column (adsorption apparatus).

—3I—Next, the MES-Ca buffer was supplied into the column for 20 minutes at the flow rate of 1 mL/min to adsorb the calcium ions to the filler.

—4I—Next, the column was filled (equilibrated) with the MES-Ca buffer. Thereafter, 100 μL of the sample solution prepared in the above step 1I was supplied (applied) into the column.

—5I—Next, the MES-Ca buffer containing 5% isopropanol was supplied into the column for 1 minute at the flow rate of 1 mL/min. Next, a mixture of the MES-Ca buffer containing 5% isopropanol and the MES-Ca buffer containing 80% isopropanol was supplied into the column for 3 minutes at the flow rate of 1 mL/min so that an amount ratio between the MES-Ca buffer containing 5% isopropanol and the MES-Ca buffer containing 80% isopropanol was continuously changed in the range of 0 to 100% of the amount of the MES-Ca buffer containing 80% isopropanol. Thereafter, the MES-Ca buffer containing 80% isopropanol was supplied into the column for 3 minutes at the flow rate of 1 mL/min to fractionate the liquid discharged from the column to different portions at every 1 mL. The endotoxin (phospholipid) contained in the liquid discharged from the column was detected by measuring absorbances thereof in the wavelength of 202 nm.

Figure 12:
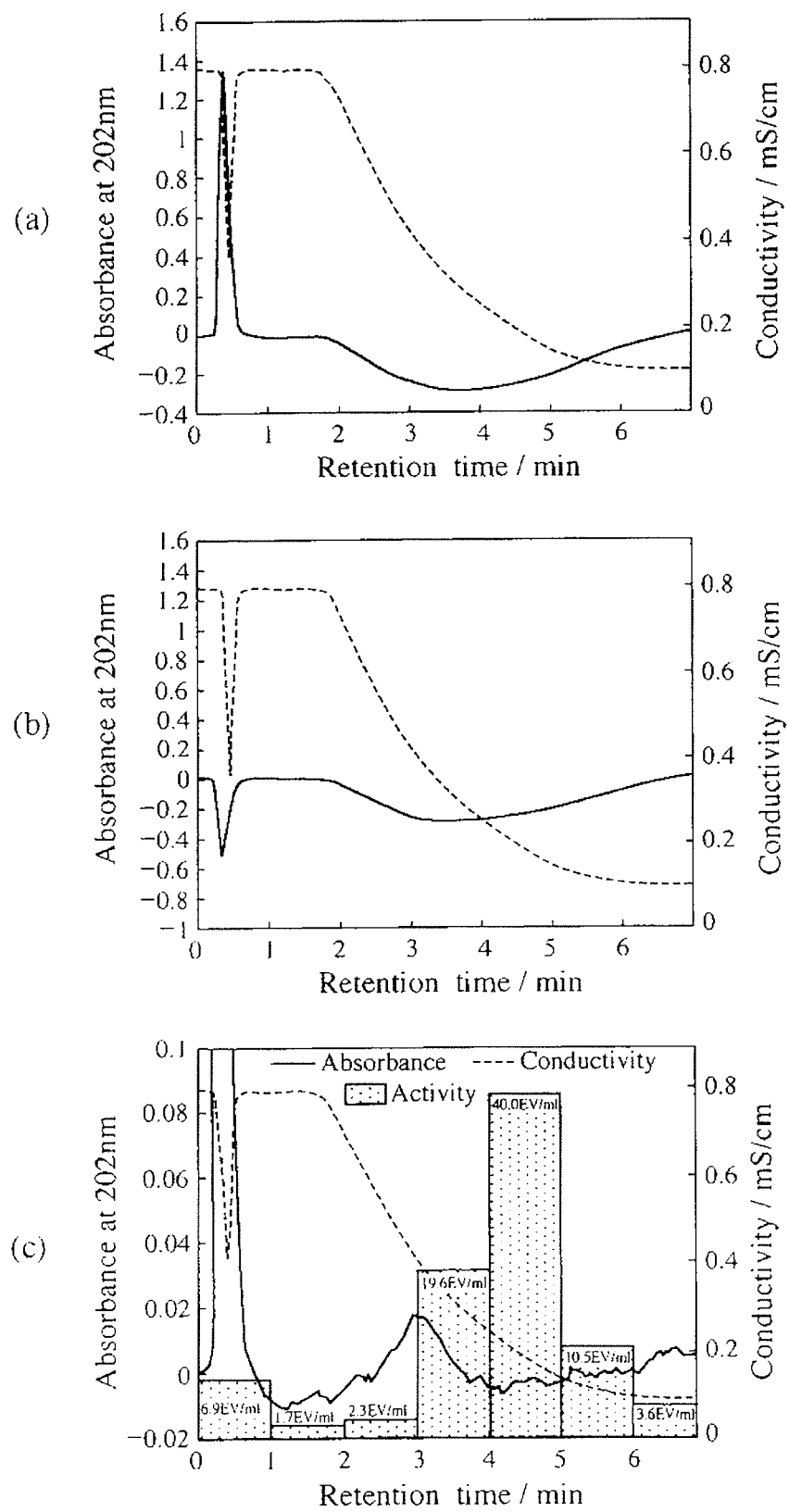
FIG. 12 shows absorbance curves in a state that a phospholipid derived from endotoxin and contained in a sample solution is separated by using an adsorption apparatus.

The results are shown in FIG. 12 (a) as an absorbance curve.

—6I—Next, pure water was supplied into the column as a blank sample. Thereafter, the same eluate as that in the above step 5I was supplied into the column to discharge the eluate from the column. Thus, absorbances derived from the eluate were measured in the wavelength of 202 nm.

The results are shown in FIG. 12(b) as an absorbance curve.

—7I—Next, the absorbances of the absorbance curve obtained in the above step 6I were subtracted from the absorbances of the absorbance curve obtained in the above step 5I.

The results are shown in FIG. 11(c) as an absorbance curve.

In this regard, since an amount of the endotoxin contained in the eluate is trace, the endotoxin was not detected in the measurement of the absorbances of the discharge liquids. Therefore, the detection of the endotoxin contained in the discharge liquids was performed by measuring activity of the endotoxin in the discharge liquids.

The results are shown in FIG. 12(c) as an absorbance curve.

As clearly seen from FIG. 12, peaks derived from the contaminating substances could be observed after about 0.5 min and after about 3 min. Further, peaks derived from the endotoxin (phospholipid) could be observed after about 4 min. Therefore, according to the present invention, it found that the endotoxin could be also separated from the sample solution.

INDUSTRIAL APPLICABILITY

According to the separation method of the present invention, it is possible to separate the phospholipid from the sample solution containing the phospholipid with the high purity by adsorbing the phospholipid contained in the sample solution to the filler and further selectively eluting the adsorbed phospholipids into the eluate. Accordingly, the separation method of the present invention has an industrial applicability.

What is claimed is:

1. A method of selectively separating a phospholipid from a sample solution containing the phospholipid, the method comprising:
   adsorbing calcium ions to a filler, at least a surface of the filler being constituted of a calcium phosphate-based compound;
   supplying the sample solution into an apparatus having a filling space, wherein the filling space being filled with the filler;
   supplying an organic solvent-based eluate into the filling space of the apparatus to obtain a liquid containing the phospholipid and discharged from the apparatus; and
   fractionating the obtained liquid per a predetermined amount to thereby separate the phospholipid from the sample solution.

2. The method as claimed in claim 1, wherein the calcium ions are contained in a calcium-containing liquid, and the adsorbing the calcium ions is performed by making the calcium-containing liquid contact with the filler.

3. The method as claimed in claim 2, wherein the calcium-containing liquid includes a calcium chloride aqueous solution.

4. The method as claimed in claim 1, wherein the phospholipid includes a phospholipid liposome which forms a liposome.

5. The method as claimed in claim 1, wherein in the supplying the organic solvent-based eluate the eluate includes isopropanol.

6. The method as claimed in claim 5, wherein in the supplying the organic solvent-based eluate the eluate is a linear gradient solution in which an amount of the isopropanol is changed from 0 to 80%.

7. The method as claimed in claim 1, wherein in the supplying the organic solvent-based eluate a flow rate of the eluate is in the range of 0.1 to 10 mL/min.

8. The method as claimed in claim 1, wherein in the fractionating the obtained liquid the phospholipid is detected by observing absorbances of the fractionated liquids in a wavelength of the range of 190 to 230 nm.

9. The method as claimed in claim 8 further comprising preliminarily obtaining an absorbance of the eluate, wherein in the fractionating the obtained liquid the phospholipid is detected by subtracting the preliminarily obtained absorbance of the eluate from the absorbance of each of the fractionated liquids to be observed.

10. The method as claimed in claim 1, wherein the calcium phosphate-based compound is constituted of hydroxyapatite as a main component thereof.

11. The method as claimed in claim 1 further comprising preparing the apparatus preliminarily.

* * * * *